United States Patent [19]

Chen et al.

[11] Patent Number: 5,668,988
[45] Date of Patent: Sep. 16, 1997

[54] METHOD FOR MINING PATH TRAVERSAL PATTERNS IN A WEB ENVIRONMENT BY CONVERTING AN ORIGINAL LOG SEQUENCE INTO A SET OF TRAVERSAL SUB-SEQUENCES

[75] Inventors: Ming-Syan Chen, Yorktown Heights; Philip Shi-lung Yu, Chappaqua, both of N.Y.

[73] Assignee: International Business Machines Corporation, Armonk, N.Y.

[21] Appl. No.: 525,891

[22] Filed: Sep. 8, 1995

[51] Int. Cl.$^6$ .................................................. G06F 17/30
[52] U.S. Cl. .......................... 395/612; 395/601; 395/602; 395/603; 395/611; 395/606
[58] Field of Search .............................. 395/611, 612, 395/606, 601, 602, 603

[56] References Cited

U.S. PATENT DOCUMENTS

| | | | |
|---|---|---|---|
| 4,221,003 | 9/1980 | Chang et al. | 395/611 |
| 5,136,523 | 8/1992 | Landers | 395/54 |
| 5,241,674 | 8/1993 | Kuorsawa et al. | 395/606 |
| 5,345,544 | 9/1994 | Iwasaki et al. | 395/140 |
| 5,412,769 | 5/1995 | Maruoka et al. | 395/140 |
| 5,486,646 | 1/1996 | Yamashita et al. | 84/635 |
| 5,577,249 | 11/1996 | Califano | 395/611 |

OTHER PUBLICATIONS

Chen et al., "Data Mining for Path Traversal Patterns in a Web Environment", IEEE, Proceedings of the 16th ICDCS, 1996, pp. 385–392.

Agrawal et al., "Fast Algorithms for Mining Association Rules in Large Databases", IEEE, Proceedings of the 20th IC on VLDB, Sep. 1994, pp. 478–499.

Park et al., "An Effective Hash Based Algorithm for Mining Association Rules" Proceedings of ACM Sigmod, May, 1995, pp. 175–186.

Agrawal et al., "Efficient Similarity Search in Sequence Databases," Proceedings of the 4th IC on FDOA, Oct. 1993.

*Primary Examiner*—Thomas G. Black
*Assistant Examiner*—Jean R. Homere
*Attorney, Agent, or Firm*—Kevin M. Jordan

[57] ABSTRACT

An efficient computer implemented method of mining path traversal patterns in a communications network. The method of the present invention comprises two steps. A method, called MF (standing for maximal forward references), is first used to convert an original sequence of log data into a set of traversal subsequences. Each traversal subsequence represents a maximal forward reference from the starting point of a user access. This step of converting the original log sequence into a set of maximal forward references will filter out the effect of backward references which are mainly made for ease of traveling, and enable us to concentrate on mining meaningful user access sequences. Accordingly, when backward references occur, a forward reference path terminates. This resulting forward reference path is termed a maximal forward reference. After a maximal forward reference is obtained, we back track to the starting point of the forward reference and begin a new forward reference path. In addition, the occurrence of a null source node also indicates the termination of an ongoing forward reference path and the beginning of a new one. Second, methods are developed to determine the frequent traversal patterns, termed large reference sequences, from the maximal forward references obtained above, where a large reference sequence is a reference sequence that appeared a sufficient number of times in the database to exceed a predetermined threshold.

14 Claims, 5 Drawing Sheets

5,668,988

METHOD FOR MINING PATH TRAVERSAL PATTERNS IN A WEB ENVIRONMENT BY CONVERTING AN ORIGINAL LOG SEQUENCE INTO A SET OF TRAVERSAL SUB-SEQUENCES

BACKGROUND OF THE INVENTION

1. Field of the Invention

The present invention relates to computer-implemented methods of mining path traversal patterns in a communications network.

2. Related Art

Due to the increasing use of computing for various applications, the importance of database mining is growing rapidly. For example, progress in barcode technology has enabled retail organizations to collect and store massive amounts of sales data. Catalog companies can also collect sales data on the orders they receive. Analysis or mining of past transaction data can provide very valuable information on customer buying behavior, and thus improve the quality of business decisions such as: what to put on sale; which merchandise should be placed on shelves together; and how to customize marketing programs, to name a few. It is essential however, to collect a sufficient amount of sales data before any meaningful conclusions can be drawn therefrom. It is hence important to devise efficient methods to conduct mining on these large databases.

Note that various data mining capabilities have been explored in the literature. Data mining is a broad field with many application-dependent problems requiring different mining techniques to solve. One of the most important data mining problems is mining association rules. Mining association rules means that, given a database of sales transactions, it is desirable to discover all associations among items in a transaction such that the presence of some items will imply the presence of other items in the same transaction. Another application, called mining classification rules, refers to developing rules to group data tuples together based on certain common features. Yet another source of data mining is ordered data, such as stock market and point of sales data. Examples of data mining applications on ordered data include searching for similar sequences, e.g., stocks with similar movement in stock prices, and sequential patterns, e.g., grocery items bought over a series of visits in sequence. From the above examples it can be appreciated that the application-dependent nature of data mining requires proper problem identification and formulation as a prerequisite to the knowledge discovery process.

Another data mining application, involving mining access patterns in communications networks, is the focus of this invention. In one type of network considered, documents or objects are linked together to facilitate interactive information access. Examples of such information networks include the World Wide Web (WWW) and on-line services, such as those using the trademarks PRODIGY, COMPUSERVE and AMERICA ONLINE, where users, seeking information of interest, travel from one object to another via the facilities (e.g., links and/or icons in a graphical user interface) provided. Understanding user access patterns in such environments will not only help improve system design and usability, (e.g., providing efficient access between highly correlated objects, better authoring design for pages, etc.) but also lead to better marketing decisions (e.g., putting advertisements in "high traffic" areas, better customer/user classification and behavior analysis, etc.). Capturing user access patterns in such environments is referred to as mining traversal patterns.

It is important to note that since users are searching the information network for information or "surfing the net", some objects are visited because of their location rather than their content. This highlights a difference between the traversal patterns problem and other data mining problems which are mainly based on customer transactions. This unique feature of the traversal pattern application necessarily increases the difficulty of extracting meaningful information from a sequence of traversal data. However, as these information services are becoming increasingly popular nowadays, there is a growing demand for analysis of user behavior to improve the quality and cost-effectiveness of such services.

SUMMARY OF THE INVENTION

Therefore, it is an object of the present invention to provide efficient computer-implemented methods of mining path traversal (or user access) patterns which can be used to improve system design and usability of the associated communication network as well as provide a necessary foundation for better customer/user classification and behavior analysis.

The computer-implemented method of the present invention comprises two steps. First, a method, called MF (standing for maximal forward references), is first used to convert an original sequence of log data into a set of traversal subsequences. Each traversal subsequence represents a maximal forward reference from the starting point of a user access. This step of converting the original log sequence into a set of maximal forward references filters out the effect of backward references which are mainly made for ease of traveling, and focuses concentration on mining meaningful user access patterns. For example, in the WWW environment, to reach a sibling node a user will typically use a "backward" icon and then a forward selection, instead of opening a new URL. Consequently, to extract meaningful user access patterns terns from the original log database, the effect of such backward traversals has to be considered in order to discover the real access patterns of interest and enable appropriate system design and usability improvements. In the preferred embodiment, the occurrence of a "backward" reference terminates a forward reference path. The resulting forward reference path is termed a maximal forward reference. After a maximal forward reference is obtained, we back track to the starting point of the forward reference and begin a new forward reference path. In addition, the occurrence of a null source node also indicates the termination of a current forward reference path and the beginning of a new one.

Second, methods are disclosed to determine frequent traversal patterns, termed large reference sequences, from the maximal forward references obtained above. A large reference sequence is a reference sequence that appears a sufficient number of times in the database to exceed a predetermined threshold. Specifically, the preferred embodiment of the present invention teaches a computer-implemented method of determining frequent node traversal patterns for optimizing system design in a communications network coupled to a computer which includes a memory and a trace collector for collecting node traversal sequences. The computer-implemented method comprises the steps of:

collecting and storing the node traversal sequences, each node traversal sequence including an end user identifier, a source node and a destination node;

sorting the node traversal sequences by said end user identifier into a series of time-ordered pairs, responsive to said steps of collecting and storing;

determining a set of maximal forward references from said series of time-ordered pairs; and determining a set of large reference sequences from said set of maximal forward references, a large reference sequence being a consecutive subsequence of said maximal forward references which occur in excess of a predetermined threshold.

These, and other objects, features and advantages of this invention will become apparent from the following detailed description of the invention taken in conjunction with the accompanying drawings.

DETAILED DESCRIPTION OF A PREFERRED EMBODIMENT

Figure 1:
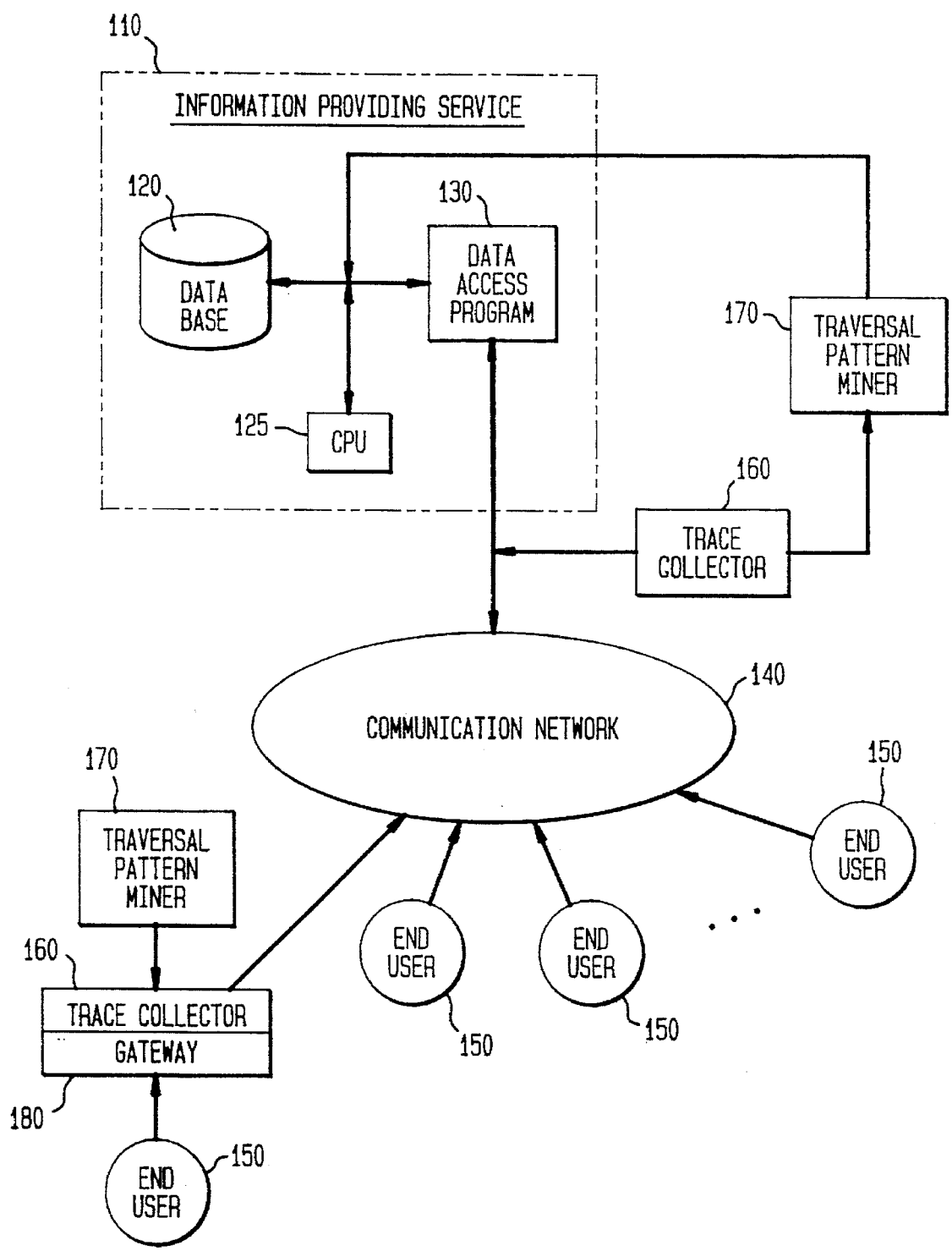
FIG. 1 is an embodiment of a system in accordance with the present invention.

The present invention provides efficient methods of mining path traversal (or user access) patterns which can be used to improve system design and usability of the associated communication network as well as provide a necessary foundation for better customer/user classification and behavior analysis. FIG. 1 illustrates an embodiment of a system in accordance with the present invention. An information providing service 110 includes a CPU 125 with associated hardware, memory, operating system, etc. An example of such a product is that sold by the IBM Corporation under the trademark RS6000. The CPU 125 is coupled to a database 120. An example of such an information providing service 110 is one trademarked as PRODIGY. Data is retrieved from the database 120 by the data access program 130, at the request of end users 150. An example database 120 and data access program 130 is that sold by the IBM Corporation under the trademark DB2/6000. (Both the RS6000 and DB2/6000 are available from IBM Corporation, Armonk, N.Y.) Data is transmitted from the information providing service 110 to end users 150 over the communication network 140. A trace collector 160 is employed to collect trace data which is later processed and analyzed by a traversal pattern miner 170 coupled to the trace collector 160. Trace collectors are well known in the art. An example of a trace collector is one sold by Network General under the trademark SNIFFER. Those skilled in the art will appreciate that in the WWW environment the communication network could represent the Internet with CPU 125 representing a Gateway 180 thereto for end user 150. Those skilled in the art will also appreciate that end user 150 could represent a local area network (LAN).

In this case, the Gateway 180 may be used to collect the trace data. The traversal pattern miner 170 (preferably embodied in computer readable program code) uses the trace data to determine users' frequent access patterns which may then be used to improve the data access program 130. For example, frequent access patterns can be cached or prefetched to minimize database access time and improve system performance. In the WWW environment, frequent user access patterns could be used to optimize system design by adding hypertext links between frequently accessed network nodes. A frequent access pattern is also referred to as a maximal reference sequence in this disclosure.

In general, a traversal log database contains, for each link traversed, a pair of (source, destination) nodes $(s_i, d_i)$. For the beginning of a new path, which is not linked to the previous traversal, the source node is typically null.

Figure 2:
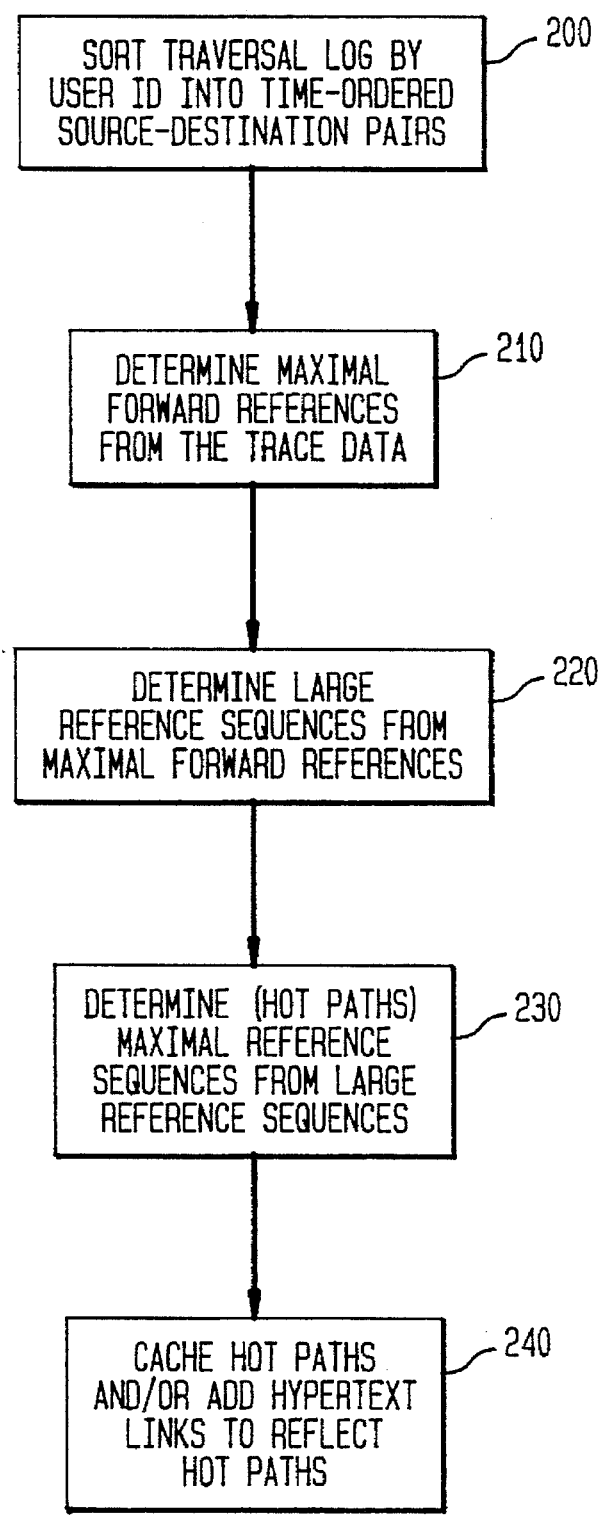
FIG. 2 shows an embodiment of a computer-implemented method in accordance with the traversal pattern miner of the present invention.

FIG. 2 shows an embodiment of the traversal pattern miner 170 of the present invention for determining maximal reference sequences. The traversal pattern miner 170 is preferably embodied in a computer usable medium as computer readable program code having access to the trace data collected by trace collector 160. In FIG. 2, step 200, the collected trace data is sorted by user-id to construct a traversal path, $\{(s_1, d_1), (s_2, d_2), \ldots, (s_n, d_n)\}$, for each user, where the source, destination pairs $(s_i, d_i)$ are ordered by time. In step 210, the sorted traversal sequences $\{(s_1 d_1),(s_2, d_2), \ldots, (s_n, d_n)\}$ of each user, are mapped into multiple subsequences, each of which represents a maximal forward reference. A maximal forward reference is defined herein as the longest forward reference sequence that does not contain a destination node which has been previously traversed, i.e., a backward reference. Let $D_F$ denote a database for storing the maximal forward references. In step 220, large reference sequences are determined from the maximal forward references. Specifically, after maximal forward references for all users are obtained, we then map the problem of finding frequent traversal patterns into the one of finding frequent occurring consecutive subsequences among all maximal forward references. A large reference sequence is a reference sequence that appears a sufficient number of times to exceed a minimum support threshold. A large k-reference is a large reference sequence with k elements. We denote the set of large k-references as $L_k$ and its candidate set as $C_k$. After all large reference sequences are obtained, the maximal reference sequences (i.e., hot paths) are determined from large reference sequences in step 230.

Note that after the large reference sequences are determined (i.e., after step 220 in FIG. 2), maximal reference sequences can be obtained, in step 230, in a straightforward manner. A maximal reference sequence is defined as a large reference sequence that is not a subset of any other maximal reference sequence. For example, suppose that {AB, BE, AD, CG, GH, BG} is the set of large 2-references (i.e., $L_2$) and {ABE, CGH} is the set of large 3-references (i.e., $L_3$). Then, the resulting maximal reference sequences are AD, BG, ABE, and CGH. A maximal reference sequence corresponds to a "hot" access pattern or "hot path" in an information providing service. In step 240, the identified hot paths may be used (as discussed previously) to improve system design, performance, and usability, e.g., by caching frequently accessed data paths for faster access by the data access program 130 or by adding hypertext links to WWW documents which reflect the newly identified hot paths, to mention a few.

Since the extraction of maximal reference sequences from large reference sequences i well known in the art and is not part of the present invention, the description will focus on the determination of large reference sequences (i.e., steps 210 and 220 in FIG. 2), which is in fact the dominating factor for the performance of mining traversal patterns.

By way of overview, an embodiment of a method to perform step 210, i.e., converting the sorted and ordered traversal sequences into a set of maximal forward references (MF) will first be described, with reference to FIG. 3. Then, two alternative methods of performing step 220, called a full-scan (FS) method and a selective-scan (SS) method, will be described with reference to FIGS. 4 and 5, respectively. Specifically, the FS and SS methods map the problem of finding frequent traversal patterns into one of finding frequent consecutive subsequences (large reference sequences).

Figure 3:
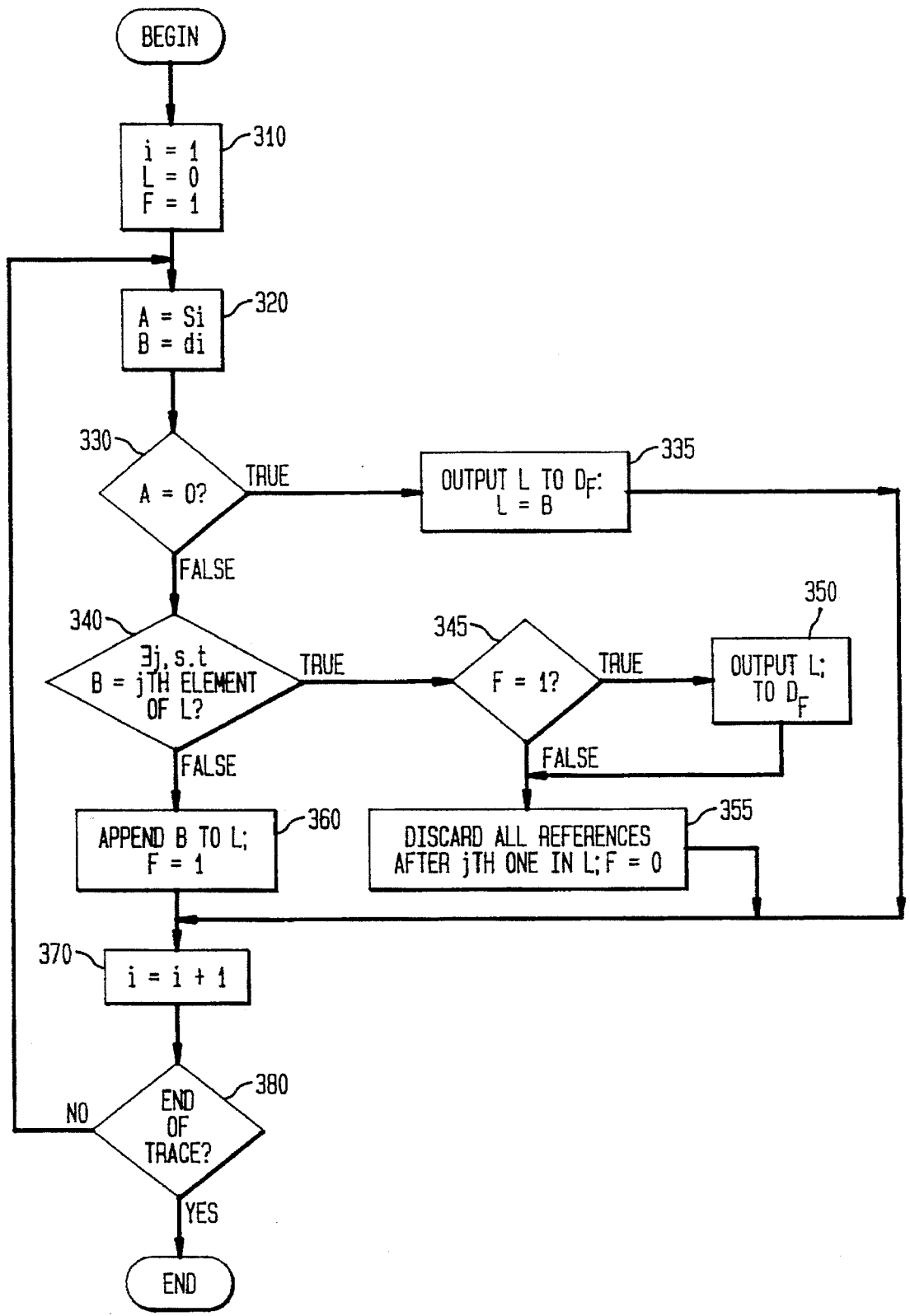
FIG. 3 shows an embodiment of a computer-implemented method in accordance with the present invention for determining maximal forward references.

Preferring now to FIG. 3, a flowchart shows an embodiment of a method (preferably embodied in a computer usable medium as computer readable program code executable on a computer) according to the present invention for converting the sorted traversal sequences $\{(s_1, d_1), (s_2, d_2), \ldots, (s_n, d_n)\}$ of each user, into multiple subsequences, each of which represents a maximal forward reference. In step 310, the element pointer i is set to 1, and string L is set to null for initialization, where string L is used to store the current forward reference path. Also, set the flag F=1 to indicate a forward traversal. In step 320, let $A=s_i$ and $B=d_i$. If A is null in step 330, then it is the beginning of a new traversal (i.e., the start of another series of time-ordered pairs). In this case, the current string L (if not null) is output to the database $D_F$ and string L=B, in step 335. Otherwise (i.e., A is not null in step 330), we check if (destination node) B equals some reference (say the j-th reference) in string L, in step 340. If yes (meaning that it is a cross-reference

TABLE 1

A sample execution by method MF.

| move (i) | $(s_i, d_i)$ | string L | output to $D_F$ |
|---|---|---|---|
| 1 | (A, B) | AB | — |
| 2 | (B, C) | ABC | — |
| 3 | (C, D) | ABCD | — |
| 4 | (D, C) | ABC | ABCD |
| 5 | (C, B) | AB | — |
| 6 | (B, E) | ABE | — |
| 7 | (E, G) | ABEG | — |
| 8 | (G, H) | ABEGH | — |
| 9 | (H, G) | ABEG | ABEGH |
| 10 | (G, W) | ABEGW | — |
| 11 | (W, A) | A | ABEGW |
| 12 | (A, O) | AO | — |
| 13 | (O, U) | AOU | — |
| 14 | (U, O) | AO | AOU |
| 15 | (O, V) | AOV | AOV (end) | back to a previous reference), output (current forward reference) string L to database $D_F$, in step 350 (if F is equal to 1 in step 345). Then, discard all the references after the j-th one in string L and set F=0, in step 355. If in step 340, B is not equal to any reference in (current forward reference) string L, then append (destination node) B to the end of string L, in step 360 (since it is continuing a forward traversal) and if the forward traversal flag is reset, i.e., F=0, also set F=1. In step 370, increment the element pointer, i.e., set i=i+1. If the sequence is tot completely scanned, in step 380 then go to step 320. Otherwise, $D_F$ contains all the maximal forward references found.

For illustrative purposes only, consider the sample traversal sequences $\{(s_i, d_i)\}$, shown in Table 1, as applied to the method of FIG. 3. The inner loop formed by steps 320–330–340–360–370 is taken for the first three moves in Table 1, resulting in string L having the value ABCD shown in row 3 (move 3). In step 340, the first backward reference is encountered in the 4-th move (i.e., from D to C). In step 345, since the forward traversal flag F is set (by step 310), the maximal forward reference ABCD is written to the database 120, in step 350. In step 355, string L is truncated at C and the forward traversal flag is reset (F=0) to indicate the reverse traversal. The next move (i.e., row 5, from C to B) indicates another backward reference. Nothing will be written to the database 120 (indicated by $D_F$), in this case however, since in conditional step 345 the forward traversal flag F=0, meaning that it is in a reverse traversal. In step 355, the string L is again truncated to AB due to the backward reference. The next move (6) is a forward reference (B, E) which, in step 360, results in the appending of the destination node E to string L, as shown and the forward traversal flag being set (F=1). As for moves 1–3, the string L is appended to reflect the forward references in moves 7–8 of Table 1. As occurred for move 4, the backward reference identified in step 340 of move 9 (from H to G) results in the maximal forward reference ABEGH being stored in database 120 (indicated by $D_F$), in step 350. The remaining traversal sequences in moves 10–15 will result in the corresponding maximal forward references being output to the database 120 (indicated by $D_F$).

Returning now to FIG. 2, in step 220, once the database ($D_F$) containing all maximal forward references for all users, $D_F$, is constructed, we can derive the frequent traversal patterns by identifying the frequent occurring reference sequences in $D_F$. A sequence $s_1, \ldots, s_n$, is said to contain $r_1, \ldots, r_k$ as a consecutive subsequence if there exists an i such that $s_{i+j}=r_j$, for $1 \leq j \leq k$. A sequence of k references, $r_1, \ldots, r_k$, is called a large k-reference sequence, if there are a sufficient number of users with maximal forward references in $D_F$ containing $r_1, \ldots, r_k$ as a consecutive subsequence.

As discussed previously, the problem of finding large reference sequences is different from that of finding large itemsets for association rules and thus calls for the design of new methods. Consequently, the present invention provides two methods for mining traversal patterns. The first one, called the full-scan (FS) method, essentially utilizes the concepts of hashing and pruning while handling the aforementioned distinctions between traversal patterns and association rules. The FS method scans the transaction database in each pass (although the size of the transaction database is reduced as it proceeds to later passes). The second method, called the selective-scan (SS) method, by contrast, reduces the number of database scans required by the efficient utilization of candidate reference sequences.

Recall that $L_k$ represents the set of all large k-references and $C_k$ is a set of candidate k-references. $C_k$ is in general a superset of $L_k$. Except as noted below, the procedure of FS is similar to prior work on mining association rules; see, e.g., "Fast Algorithms for Mining Associations Rules in Large Databases," by R. Agrawal and R. Srikant, *Proc. of VLDB conference*, September 1994, pp. 478–499. By way of overview, after scanning the database ($D_F$) FS obtains large 1-reference sequence $L_1$. Starting with k=2, FS generates candidate reference sets $C_k$ from $L_{k-1}$, and determines the set of large k-references. This is detailed in FIG. 4 (to be explained later). Note that as in mining association rules, a set of candidate references, $C_k$, can be generated by merging $L_{k-1}$ with itself, denoted by $L_{k-1}*L_{k-1}$. However, to address the inherent differences between traversal patterns and association rules, we modify this approach as follows. For any two distinct reference sequences in $L_{k-1}$, say $r_1, \ldots, r_{k-1}$ and $s_1, \ldots, s_{k-1}$, we join them together to form a k-reference sequence only if either $r_1, \ldots, r_{k-1}$ contains $s_1, \ldots, s_{k-2}$ or $s_1, \ldots, s_{k-1}$ contains $r_1, \ldots, r_{k-2}$ (i.e., after dropping the first element in one sequence and the last element in the other sequence, the remaining two (k−2)-references are identical).

To count the occurrences of each k-reference in $C_k$ to determine $L_k$, we need to scan through the database $D_F$. From the set of maximal forward references, we determine, among k-references in $C_k$, large k-references $L_k$. After scanning the entire database, those k-references in $C_k$ with a count exceeding the predetermined threshold become $L_k$. If $L_k$ is non-empty, the process continues for the next iteration, i.e., pass k+1.

Figure 4:
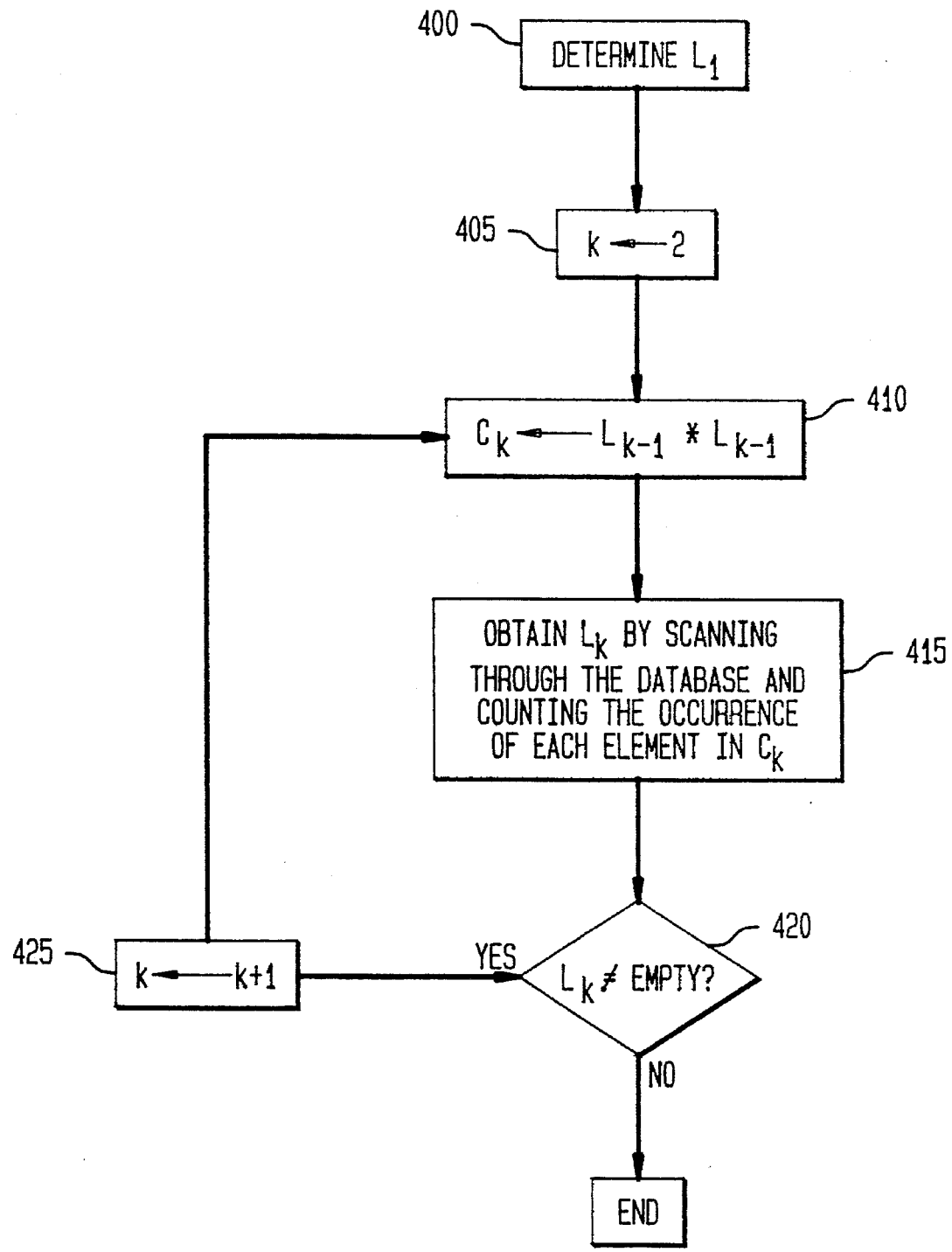
FIG. 4 shows a flowchart of the Full-scan method according to the present invention for determining large reference sequences from the maximal forward references.

Consider FIG. 4 which is a flowchart of an embodiment of the Full Scan (FS) method according to the present invention. The method is preferably embodied in a computer usable medium as computer readable program code executable on a computer. In step 400, the first large reference sequence $L_1$ is determined. Then k is initialized to 2, in step 405. In step 410, $C_k$ is derived from $L_{k-1}*L_{k-1}$ as explained above. In step 415, $L_k$ is obtained by scanning through the database and counting the occurrence of each element in $C_k$. Those elements appearing a sufficient number of times to exceed a predetermined threshold will form $L_k$. In step 420, if $L_k$ is empty, there are no large k-references and the process stops. Otherwise, in step 425 k is incremented by 1 and the process repeats with step 410 Being executed again.

Note that when k is small (especially for the case of k=2), deriving $C_k$ by joining $L_{k-1}$ with itself will result in a very large number of candidate references and the hashing technique proposed in "An Effective Hash Based Method for Mining Association Rules," by J. S. Park, M. S. Chen and P. S. Yu, *Proc. of ACM SIGMOD, May* 1995, pp. 175–186, can be used to derive a smaller set of candidate references, thus improving performance. This is especially true for the case of k=2. The aforementioned hashing technique which counts the number of occurrences of each large 2-reference using a hash table ($H_2$) is also applicable here. This can substantially reduce the size of candidate reference sequence $C_2$. As k increases, the size of $L_{k-1}*L_{-1}$ can decrease significantly and $C_k$ can again be efficiently generated from $L_{k-1}*L_{k-1}$. We further note that in the above paper by Park, Chen and Yu, every time the database is scanned, the size of the database is reduced thereby improving the efficiency of future scans. This database reduction technique cam also be incorporated into FS.

The selective scan method (SS) is similar to method FS in that it can also employ the aforementioned hashing and database reduction techniques to reduce both CPU and I/O costs. The SS method improves upon the FS method, however, further reducing disk I/O costs by properly utilizing the information contained in candidate references sequences obtained in prior passes, thereby avoiding database scans in some passes, The SS method according to the present invention is described below. A flowchart of an embodiment of the SS method, shown in FIG. 5, will be explained later. Recall that method FS can generate a reduced number of candidate 2-references by using a hashing technique. In fact, this reduced candidate reference set $C_2$ can be used to generate the candidate 3-references $C_3$. Clearly, a $C'_3$. generated from $C_2*C_2$, instead of from $L_2*L_2$, will have a size greater than $|C_3|$ where $C_3$ is generated from $L_2*L_2$. However, if $|C'_3|$ is not much larger than $|C_3|$, and memory capacity is sufficient to store both $C_2$ and $C'_3$, we can simultaneously find $L_2$ and $L_3$ during the next database scan, thereby eliminating one database scan. Note that by using this concept, one can generate all large reference sequences $L_k$'s with is new is two scans of the database (i.e., one initial scan to determine $L_1$ and a final scan to determine all other large reference sequences), assuming that $C'_k$ for k≧3 is generated from $C'_{k-1}$ and all $C'_k$s for k>2 can be stored in memory.

Note that when the minimum support threshold is relatively low or the candidate large reference sequences are long, $C_k$ and $L_k$ could become large. Specifically, if $|C'_{k+1}|>|C'_k|$ for k≧2, then the generation of all subsequent $C'_j$, j>k+1, from candidate large reference sets may incur excessive CPU overhead and disk I/O costs since the size of $C_j$ may increase rapidly. In order to address this problem, if $|C'_{k+1}|>|C'_k|$ for some k≧2, a database scan may be performed to obtain $L_{k+1}$ before the set of candidate references becomes excessive. In this case after the database scan, one can obtain the large reference sequences not yet determined (say, up to $L_m$) and then construct the set of candidate (m+1)-references, $C_{m+1}$, based on $L_m$ from that point. As for the FS method, this timely database scan reduces the size of the database, thereby improving the efficiency of future scans. We then derive $C'_{k+2}$ from $L_{k+1}$. (We note that $C'_{k+2}$ in fact equals to $C_{k+2}$ here.) After that, we again use $C'_j$ to derive $C'_{j+1}$ for j≧k+2. The process continues until the set of candidate (j+1)-references is empty.

Figure 5:
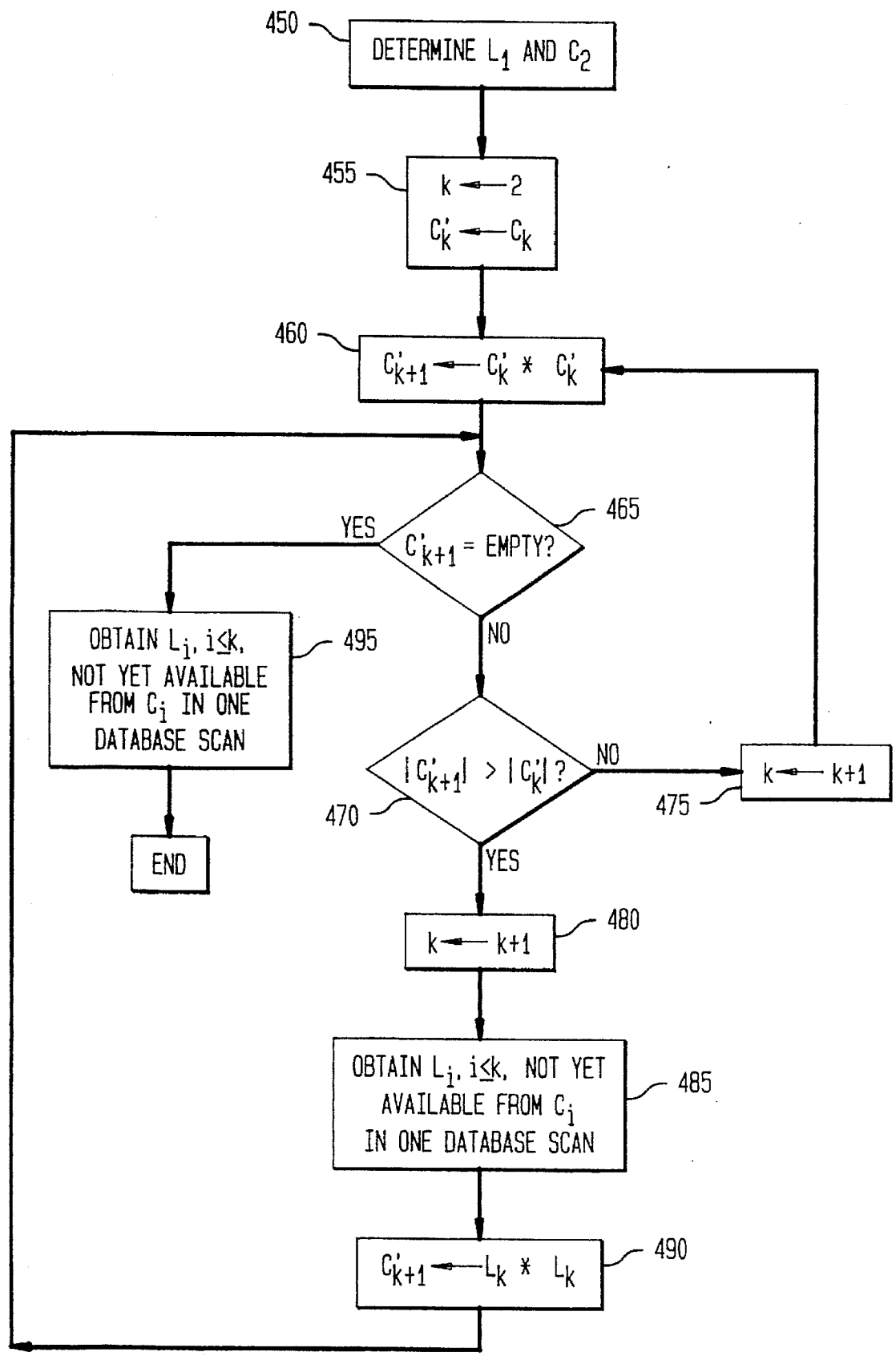
FIG. 5 shows a flowchart of the Selective-scan method according to the present invention for determining large reference sequences from the maximal forward references.

A flowchart of an embodiment of the SS method is shown in FIG. 5. The method is preferably embodied in a computer usable medium as computer readable program code executable on a computer. In step 450, large reference sequence $L_1$ and candidate reference-2 sequence $C_2$ are determined.

TABLE 2

Results from an example run by FS and SS.

| k | 1 | 2 | 3 | 4 | 5 | 6 |
|---|---|---|---|---|---|---|
| | | | Method FS | | | |
| $C_k$ | | 121 | 84 | 58 | 22 | 3 |
| $L_k$ | 94 | 91 | 84 | 58 | 21 | 3 |
| | scan | scan | scan | scan | scan | scan |
| | | | Method SS | | | |
| $C_k$ | | 121 | 144 | 58 | 22 | 3 |
| $L_k$ | 94 | 91 | 84 | 58 | 21 | 3 |
| | scan | — | scan | — | — | scan |

In step 455, k is initialized to 2 and $C'_k$ is set to $C_k$. Then in step 460, $C'_{k+1}$ is derived from $C'_k*C'_k$. If $C'_{k+1}$ is not empty, in step 465, the size of $C'_{k+1}$ is compared with that of $C'_k$, in step 470. If it is not greater, k is incremented by 1, in step 475, and the process loops back to step 460. Otherwise, in step 480 k is incremented by 1. In step 485, all $L_i$'s, i≦k, which are not yet available, will be determined from the corresponding $C_i$'s in one scan of the database. In step 490, $C'_{k+1}$ is derived from $L_k*L_k$ and the process repeats again from step 465. If $C'_{k+1}$ is empty in step 465, all $L_i$'s, i≦k, which are not yet available, will be determined from the corresponding $C_i$'s in one scan of the database in step 495.

For illustrative purposes only, a comparative example of the FS and SS methods is given in Table 2. In Table 2, the numbers in rows $C_k$ are the numbers of items in the candidate sets of large reference sequences, whereas those in rows $L_k$ are the numbers of items in the sets of large reference sequences. For example, the set of large reference sequences $L_1$ consists of 94 items. It can be seen that under SS, a timely database scan is performed in pass k=3 when $|C_3|>|C_2|$. In this example run, FS performs a database scan in each pass to determine the corresponding large reference sequences, resulting in six database scans. On the other hand, SS scans the database only three times (skipping database scans in passes 2, 4 and 5), while obtaining the same results. Considering both CPU and I/O times, SS will usually outperform FS.

Thus, the present invention provides efficient methods of mining path traversal (user access) patterns which can be used to improve system design and usability of the associated communication network as well as provide a necessary foundation for better customer/user classification and behavior analysis.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. A computer-implemented method of determining frequent node traversal patterns for optimizing system design in a communications network coupled to a computer which includes a memory and a trace collector for collecting node traversal sequences, comprising the steps of:

collecting and storing the node traversal sequences, each node traversal sequence including an end user identifier, a source node and a destination node;

sorting the node traversal sequences by said end user identifier into a series of time-ordered pairs, responsive to said steps of collecting and storing;

determining a set of maximal forward references from said series of time-ordered pairs; and determining a set of large reference sequences from said set of maximal forward references, a large reference sequence being a consecutive subsequence of said maximal forward references which occurs in excess of a predetermined threshold.

2. The method of claim 1, comprising the step of:

constructing a set of maximal reference sequences from said large reference sequences, wherein a maximal reference sequence is not a subset of another maximal reference sequence.

3. The method of claim 1 wherein said computer comprises a gateway to a wide area network.

4. The method of claim 1 wherein said step of determining said set of maximal forward references comprises the steps of:

initializing a current forward reference path to a null value and setting a forward traversal flag;

for each of said time-ordered pairs, performing the following steps:

if the source node is null, storing the current forward reference path in the memory and re-setting the current forward reference path to a null value;

if the source node is not null, determining whether the destination node is contained in the current forward reference path;

if the destination node is a subset of the current forward reference path and the forward traversal flag is set, storing the current forward reference in the memory, truncating the current forward reference path after the destination node, and resetting the forward traversal flag;

if the destination node is a subset of the current forward reference path and the forward traversal flag is not set, truncating the current forward reference path after the destination node, and resetting the forward traversal flag; and if the destination node is not a subset of the current forward reference path, appending the destination node to the current forward reference path and setting the forward traversal flag.

5. A computer program product comprising:

a computer usable medium having computer readable program code means embodied therein for determining frequent node traversal patterns in a communications network coupled to a computer which includes a memory and a trace collector for collecting node traversal sequences, said computer readable program code means comprising:

computer readable program code means for causing the computer to effect collecting and storing the node traversal sequences, each node traversal sequence including an end user identifier, a source node and a destination node;

computer readable program code means for causing the computer to effect sorting the node traversal sequences by end user identifier into a series of time-ordered pairs, responsive to said computer readable program code means for causing the computer to effect said collecting and storing;

computer readable program code means for causing the computer to effect determining a set of maximal forward references from said series of time-ordered pairs; and computer readable program code means for causing the computer to effect determining a set of large reference sequences from said set of maximal forward references, a large reference sequences being a consecutive subsequence of said maximal forward references which occurs in excess of a predetermined threshold.

6. The computer program product of claim 5, comprising:

computer readable program code means for causing the computer to effect constructing a set of maximal reference sequences from said large reference sequences, wherein a maximal reference sequence is not a subset of another maximal reference sequence.

7. The computer program product of claim 5 wherein wherein said computer readable program code means for causing the computer to effect determining a set of maximal forward references comprises:

computer readable program code means for causing the computer to effect initializing a current forward reference path to a null value and setting a forward traversal flag;

computer readable program code means for causing the computer to perform the following steps for each of said time-ordered pairs:

computer readable program code means for causing the computer, in the event the source node is null, to effect storing the current forward reference path in the memory and re-setting the current forward reference path to a null value;

computer readable program code means for causing the computer, in the event the source node is not null, to effect determining whether the destination node is contained in the current forward reference path;

computer readable program code means for causing the computer, in the event the destination node is a subset of the current forward reference path and the forward traversal flag is set, to effect storing the current forward reference in the memory, truncating the current forward reference path after the destination node, and resetting the forward traversal flag;

computer readable program code means for causing the computer, in the event the destination node is a subset of the current forward reference path and the forward traversal flag is not set, to effect truncating the current forward reference path after the destination node, and resetting the forward traversal flag; and computer readable program code means for causing the computer, in the event the destination node is not a subset of the current forward reference path, to effect appending the destination node to the current forward reference path and setting the forward traversal flag.

8. The computer program product of claim 5 wherein said computer comprises a gateway to a wide area network.

9. A program storage device readable by a computer tangibly embodying a program of instructions executable by said computer to perform method steps for determining frequent node traversal patterns in a communications network coupled to a computer which includes a memory and a trace collector for collecting node traversal sequences, said method steps comprising:

collecting and storing the node traversal sequences, each node traversal sequence including an end user identifier, a source node and a destination node;

sorting the node traversal sequences by said end user identifier into a series of time-ordered pairs, responsive to said steps of collecting and storing;

determining a set of maximal forward references from said series of time-ordered pairs; and determining a set of large reference sequences from said set of maximal forward references, a large reference sequence being a consecutive subsequence of said maximal forward references which occurs in excess of a predetermined threshold.

10. The program storage device of claim 9, further comprising the method step of:

constructing a set of maximal reference sequences from said large reference sequences, wherein a maximal reference sequence is not a subset of another maximal reference sequence.

11. The program storage device of claim 9 wherein said step of determining said set of maximal forward references comprises the steps of:

initializing a current forward reference path to a null value and setting a forward traversal flag;

for each of said time-ordered pairs, performing the following steps:

if the source node is null, storing the current forward reference path in the memory and re-setting the current forward reference path to a null value;

if the source node is not null, determining whether the destination node is contained in the current forward reference path;

if the destination node is a subset of the current forward reference path and the forward traversal flag is set, storing the current forward reference in the memory, truncating the current forward reference path after the destination node, and resetting the forward traversal flag;

if the destination node is a subset of the current forward reference path and the forward traversal flag is not set, truncating the current forward reference path after the destination node, and resetting the forward traversal flag; and if the destination node is not a subset of the current forward reference path, appending the destination node to the current forward reference path and setting the forward traversal flag.

12. The program storage device of claim 9 wherein said computer comprises a gateway to a wide area network.

13. The program storage device of claim 10, said method steps further comprising:

caching said maximal reference sequences for reducing an access time to the frequent node traversal pattern associated with said maximal reference sequence.

14. A program storage device readable by a computer tangibly embodying a program of instructions executable by said computer to perform method steps for determining frequent node traversal patterns in a communications network coupled to a computer which includes a memory and a trace collector for collecting node traversal sequences, said method steps comprising:

collecting and storing the node traversal sequences, each node traversal sequence including an end user identifier, a source node and a destination node;

sorting the node traversal sequences by said end user identifier into a series of time-ordered pairs, responsive to said steps of collecting and storing;

determining a set of maximal forward references from said series of time-ordered pairs;

determining a set of large reference sequences from said set of maximal forward references, a large reference sequence being a consecutive subsequence of said maximal forward references which occurs in excess of a predetermined threshold;

constructing a set of maximal reference sequences from said large reference sequences, wherein a maximal reference sequence is not a subset of another maximal reference sequence; and caching said maximal reference sequences for reducing an access time to the frequent node traversal pattern associated with said maximal reference sequence.

* * * * *

UNITED STATES PATENT AND TRADEMARK OFFICE
CERTIFICATE OF CORRECTION

PATENT NO. : 5,668,988
DATED : Sep. 16, 1997
INVENTOR(S) : Ming-Syan Chen, et al It is certified that error appears in the above-indentified patent and that said Letters Patent is hereby corrected as shown below:

Column 2, line 25, delete "first";

column 4, line 61, change "i" to --is--;

column 5, line 56, change "tot" to --not--;

column 6, line 51, change "*conference*" to --*Conference*--;

column 7, line 22, change "Being" to --being--;

column 7, line 35, change "$L_{-1}$" to --$L_{k-1}$--;

column 7, line 40, change "cam" to --can;

column 7, line 63, change "is new is" to --as few as--;

Signed and Sealed this

Thirteenth Day of January, 1998

Attest:

Attesting Officer

BRUCE LEHMAN

Commissioner of Patents and Trademarks